US006655739B2

United States Patent
Furukawa

(10) Patent No.: US 6,655,739 B2
(45) Date of Patent: Dec. 2, 2003

(54) SEAT SLIDING STRUCTURE

(75) Inventor: Akira Furukawa, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 92 days.

(21) Appl. No.: 10/003,337

(22) Filed: Oct. 31, 2001

(65) Prior Publication Data

US 2002/0057007 A1 May 16, 2002

(30) Foreign Application Priority Data

Oct. 31, 2000 (JP) ........................................ 2000-331628

(51) Int. Cl.⁷ ................................................ B60N 2/07
(52) U.S. Cl. ............................... 297/344.11; 296/65.13; 248/429; 248/430
(58) Field of Search ...................... 297/344.11; 248/429, 248/430; 296/63, 65.13, 65.14, 65.15

(56) References Cited

U.S. PATENT DOCUMENTS 5,104,084 A    4/1992 Kumagai et al.
6,086,018 A  * 7/2000 Gobel et al. ......... 296/65.13 X

FOREIGN PATENT DOCUMENTS

GB    2 221 152 A    1/1990

OTHER PUBLICATIONS

International Search Report corresponding to German Patent Application No. 101 52 406.4–14 dated Apr. 23, 2002.

* cited by examiner

*Primary Examiner*—Rodney B. White
(74) *Attorney, Agent, or Firm*—Alston & Bird LLP

(57) ABSTRACT

A sliding rail structure that allows the back and forth travel of the seat with respect to the vehicle floor surface, wherein the sliding rail 4 comprises a lower rail 8 and an upper rail 7 that is mounted on the seat in advance, and a groove 14 longer than the lower rail 8 is formed in the longitudinal direction of the floor panel 9 constituting the vehicle floor surface. The lower rail 8 and an extension 15 that continues from the lower rail 8 are installed in the groove 14, and the upper rail 7 slides inside the lower rail 8 and extension 15. This structure provides both satisfactory dimensional accuracy for installation of the seat and sliding rail as well as a long traveling distance in the longitudinal direction, facilitates passengers to get on and off the vehicle floor, and improves appearance.

6 Claims, 11 Drawing Sheets

SEAT SLIDING STRUCTURE

FIELD OF THE INVENTION AND RELATED ART STATEMENT

The present invention relates to the structure of a seat sliding in the back and forth with respect to the floor surface of a vehicle.

More particularly, the present invention relates to a slide rail structure designed to make a lower rail longer to provide a long traveling distance in the longitudinal direction in the vehicle. This structure is also applicable to a driver's seat, passenger seat and bench-formed seat in addition to a split type rear seat.

To prevent synchronization errors of the slide rails 101 for a normal seat 100, the sliding rails 101 are mounted on the seat 100 while mounting dimensional accuracy is maintained with a jig, as illustrated in FIGS. 9 (*a*) and (*b*). Then the seat 100 provided with the sliding rails 101 is brought into the vehicle through the door opening thereof, and the seat 100 is locked on a floor panel 102 through the sliding rail 101.

Furthermore, the sliding rail 101 is locked in either of the following two ways: it is locked as it is mounted on a carpet 103 covering the floor panel 102, or it is embedded into a carpet by cutting a notch therein.

According to the conventional mounting structure, the sliding rail 101 and seat 100 are mounted on the vehicle after they have been put together into one piece. Although the sufficient dimensions for mounting sliding rails 101 may be obtained, the sliding rail 101 must have a short enough length which allows the seat 100 to be carried into the vehicle through the door opening thereof since the seat 100 is brought inside through the opening. This imposes a restriction on the length of the sliding rail 101, so it has been difficult to set a long back and forth traveling distance of the seat 100 according to the conventional method.

Furthermore, the lower rail 104 of the sliding rail 101 is positioned above the floor panel 102. So when an occupant moves in the vehicle or gets out of it, he or she has to mind the lower rail 104.

When it is embedded into the carpet 103, a long notch must be cut toward the forward direction in the carpet 103 to ensure that an upper rail 105 does not interfere with the carpet 103 when it moves forward, as illustrated in FIG. 10. This is certainly not an eye-pleasing external appearance.

According to some conventional method shown in FIGS. 11 and 12, a sliding rail unit 106 having a specified length is locked on the floor panel 102, and the seat 100 alone is carried into the vehicle through the door opening. Then the seat 100 and sliding rail unit 106 are combined with each other by bolts 108 and nuts 109 using brackets 107 or the like.

In this case, the sliding rail units 106 can be embedded into the floor panel 102.

This makes it possible to have a long back and forth traveling distance of the seat 100, and permits the sliding rail to be embedded. This provides good appearance. However, the accuracy of mounting the sliding rails may be affected by the car body with increasing errors, so that a synchronization mismatch may occur.

OBJECT AND SUMMARY OF THE INVENTION

The object of the present invention is to provide a seat sliding structure which ensures satisfactory dimensional accuracy for installation of the seat and sliding rails and a long traveling distance in the back and forth direction, makes it easier for passengers to get on and off the vehicle floor and improves appearance.

To solve these problems, the present invention provides a sliding rail structure which allows seat movement in the longitudinal direction of the vehicle (as opposed to the width direction of the vehicle) with respect to the vehicle floor surface wherein a sliding rail comprising a lower rail and an upper rail is mounted on the seat in advance, and a groove longer than the lower rail is formed in the longitudinal direction of the floor constituting the vehicle floor surface. This structure is further characterized in that the lower rail and an extension that continues with this lower rail are installed in the groove to ensure that the upper rail can slide inside the lower rail and extension.

The present invention is further characterized in that the extension has a bracket placed in the groove.

The present invention is still further characterized in that the extension has a cover to protect or close the top surface of the extension.

The present invention is still further characterized in that a lower rail lip is provided on the top surface of the lower rail and a lip is placed at the center of the cover.

The present invention is still further characterized in that a lower rail is embedded in the concave-shaped portion of the floor carpet protecting the floor panel, and the lower rail lip and floor carpet are arranged on nearly the same plane or level so as to have a substantially flash appearance.

DETAILED DESCRIPTION OF PREFERRED EMBODIMENT

Figure 1:
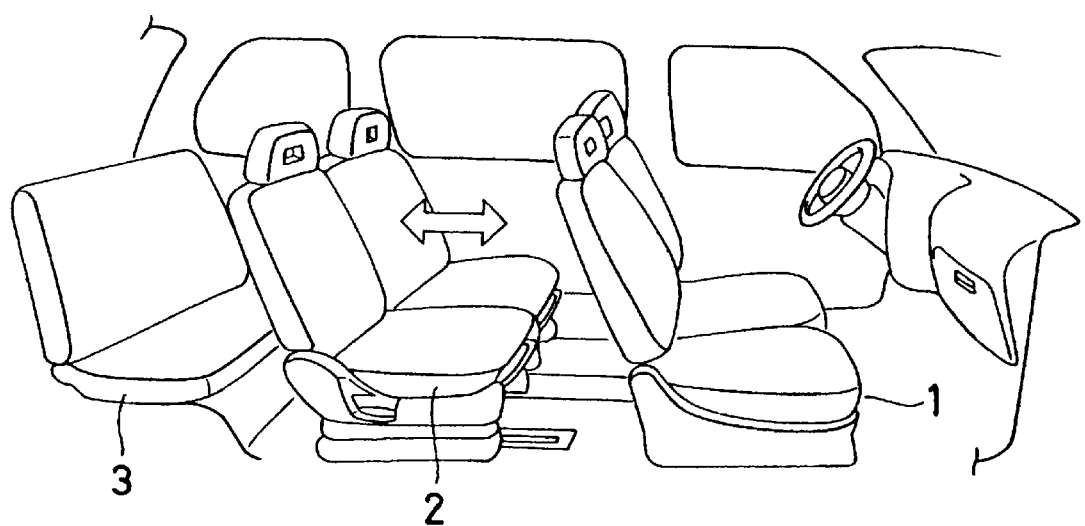
FIG. 1 is a conceptual perspective view representing a vehicle seat.

The following describes the embodiments according to the present invention with reference to drawings:

As illustrated in FIG. 1, multiple rows of seats 1, 2 and 3 are arranged inside the vehicle, and a longer traveling distance of the seat 2 in the second row is provided along the back and forth direction to allow the seat 2 in the second row to travel a long distance along the back and forth direction (arrow marked direction in FIG. 1). This ensures a larger trunk and seating space, and improves comfort to ride in. This way, a great variety of layouts may be provided for the interior of the vehicle.

With reference to this embodiment, the following describes the example in which the sliding rail mechanism providing a long traveling distance in the back and forth direction is applied to the seat 2 of the second row. This mechanism is also applicable to other seats. Furthermore, the number of the seat rows can be changed in conformity to particular requirements.

Figure 2:
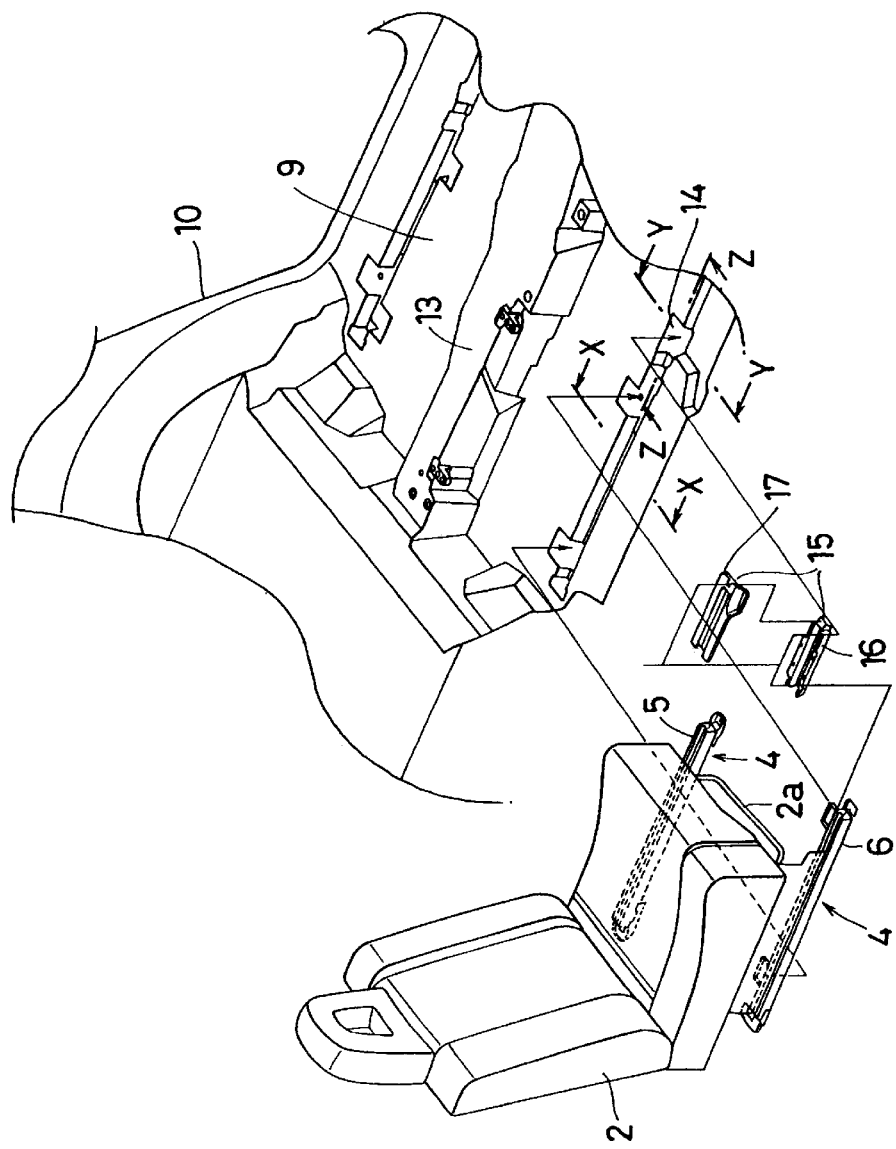
FIG. 2 is a perspective view representing one embodiment of the sliding structure of the seat according to the present invention.

FIG. 2 shows the sliding structure of the seat 2 in the second row. It represents the assembling structure of the seat 2 of the second row provided with the sliding mechanism which provides a long traveling distance in the back and forth direction.

The seat 2 is provided in advance with a sliding rail 4 on the inner side (hereinafter referred to as "inner rail 5") and another sliding rail 4 on the outer side (hereinafter referred to as "outer rail 6").

This is intended to improve the dimensional accuracy at the position for installation of the sliding rail 4 with respect to the seat 2.

The impact of the accuracy of installation on the seat 2 upon the performance of the sliding rail 4 will be described in the following.

The inner rail 5 and outer rail 6 are connected with each other by means of a common release lever 2a which is used to lock or unlock the slide position. Therefore, the inner rail 5 and outer rail 6 are required to be parallel to each other, and high dimensional accuracy is required in the back and forth positioning.

Namely, if the dimensional accuracy of mutual installation positions is ensured, the inner rail 5 and outer rail 6 can be locked or unlocked simultaneously by a single lever operation, and the seat 2 can be smoothly moved in the back and forth direction. To express this state, we say that the sliding rail 4 is "synchronized."

When large errors exist in the parallelism between the inner rail 5 and outer rail 6 and also in the dimensional accuracy in the back and forth direction, a failure may occur. For example, even if one of the inner rail 5 and outer rail 6 is locked or unlocked, the other rail may not be locked or unlocked, or sliding the sliding rail 4 may become more difficult.

To express this state, we say that the sliding rail 4 is "not synchronized," or synchronization errors have occurred.

To avoid synchronization errors in accordance with the present invention, an assembling jig is used to install the inner rail 5 and outer rail 6 to the seat 2 to ensure that relative dimensional accuracy through the seat 2 can be improved.

The following describes the details of the structure of the outer rail 6, which is a sliding rail 4 on the outer side, which is one of the major features of the present invention.

Figure 3:
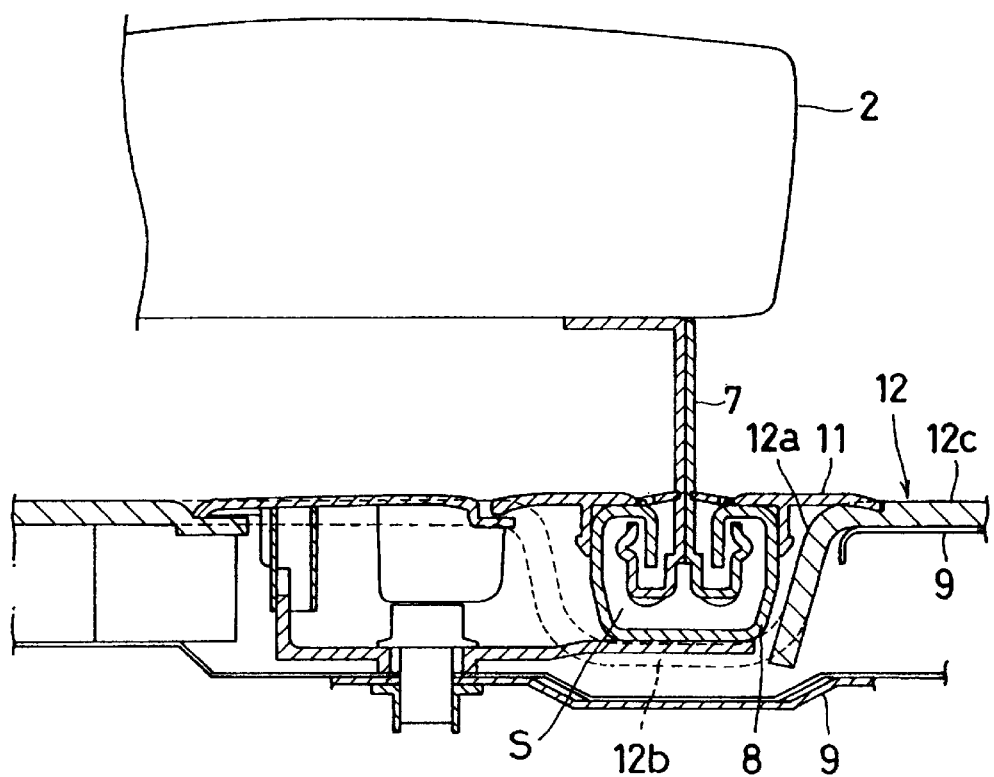
FIG. 3 is a sectional view of FIG. 2 along line X—X.

As shown in FIG. 3, the outer rail 6 comprises an upper rail 7 mounted on the side of the seat 2 and a lower rail 8 on the side of the floor panel 9. The upper rail 7 and lower rail 8 are designed in a structure to slide back and forth with each other.

The lengths of the upper rail 7a and lower rail 8 are set to be almost the same as that of the sliding rail 4 mounted on the normal seat (e.g., the seat 1 in the first row) to ensure that they can be brought into the vehicle through the door opening 10, with the sliding rail 4 mounted on the seat 2 in advance. (See FIG. 2).

Further, to block the clearances with the upper rail 7 and the clearance with the floor panel 9, a lower rail lip 11 is mounted on the top surface of the lower rail 8, as shown in FIG. 3.

The structure of mounting the sliding rail 4 and floor panel 9 will be described in the following.

As shown in FIG. 2, the inner rail 5 and outer rail 6 put together with the seat 2 are mounted on the floor panel 9 with its surface covered by a floor carpet 12. First, the inner rail 5 is installed on the tunnel 13 provided at the center of the floor panel 9 and fixed therein. Then the lower rail 8 of the outer rail 6 is installed into groove 14 provided in the floor panel 9.

The length of the groove 14 is greater than that of the lower rail 8, and an extension 15 is installed inside the groove 14 located forward of the lower rail 8.

The extension 15 comprises a bracket 16 installed in the groove 14 and a cover 17 to block form and/or close the top surface of the groove 14.

Figure 4:
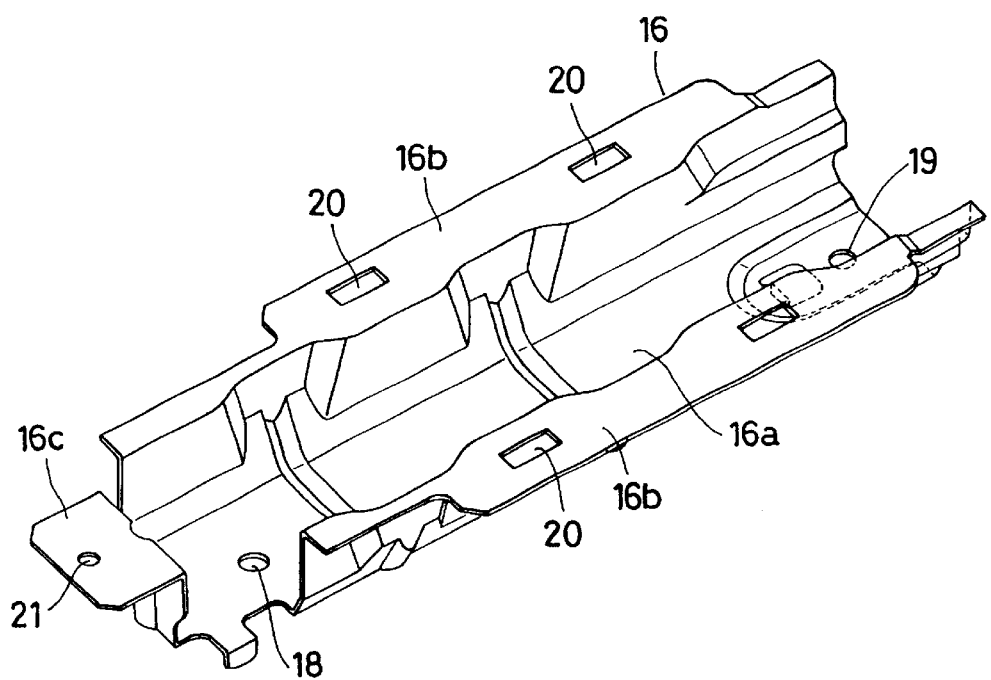
FIG. 4 is a perspective view representing the bracket of the extension given in FIG. 2.

FIG. 4 shows the details of the bracket 16 of the extension 15.

The bracket 16 is shaped in a box form where top surface and rear portion are open. The central concave 16a forming the bottom surface is equipped with a forward installation hole 18 and a backward installation hole 19. Square holes 20 are provided on the flanges 16b on both sides of the top surface, and a hole 21 is provided on the flange 16c on the front of the top surface. Two square holes 20 are provided at specified intervals on each of the right and left flanges 16b.

Figure 5:
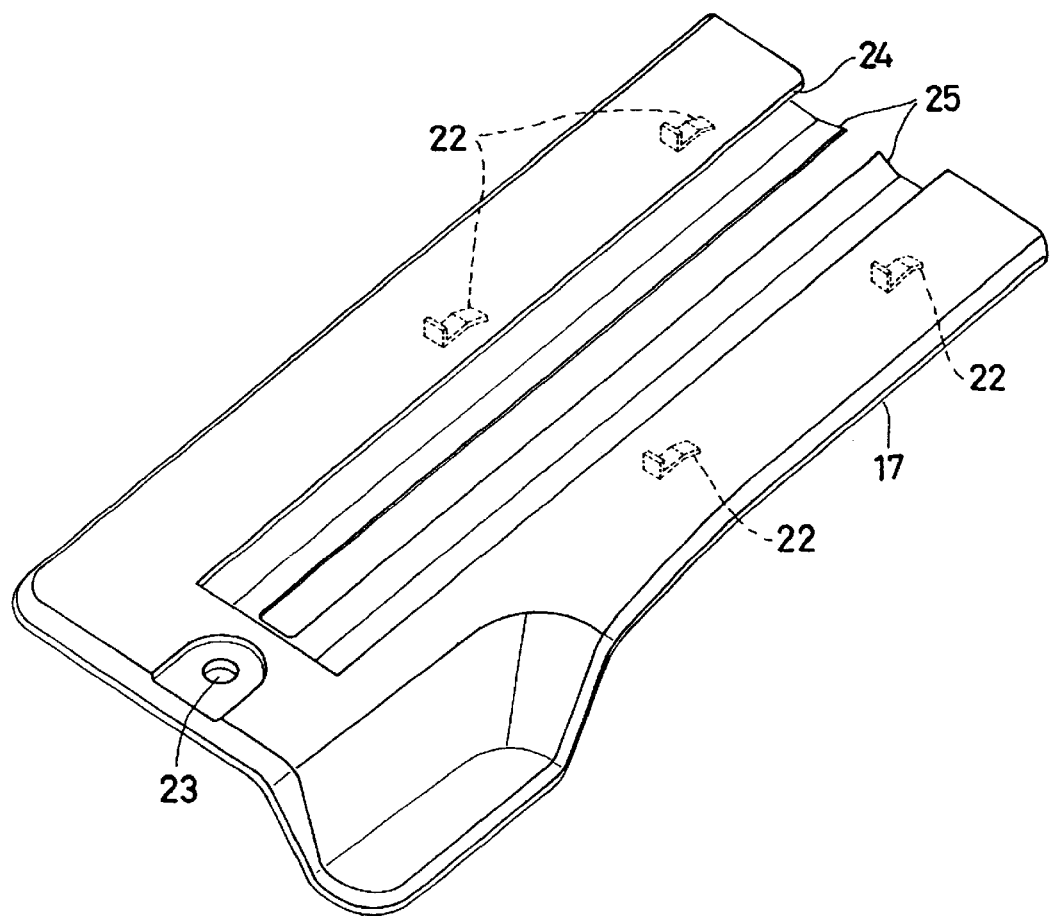
FIG. 5 is a perspective view representing the cover of the extension given in FIG. 2.

FIG. 5 shows the details of the cover 17 of the extension 15. Jaws 22 forming hooks facing backward are formed on the back of the cover 17, and a hole 23 is formed on the front end. These two jaws 22 are formed at specified intervals on each of the plate surfaces on the right and left to be engaged with the square holes 20 of the bracket 16.

Slits 24 are formed at the center of the cover 17 in the longitudinal direction (back and forth), and lips 25 extend from either side of the slits 24 so that they approach each other.

Figure 6:
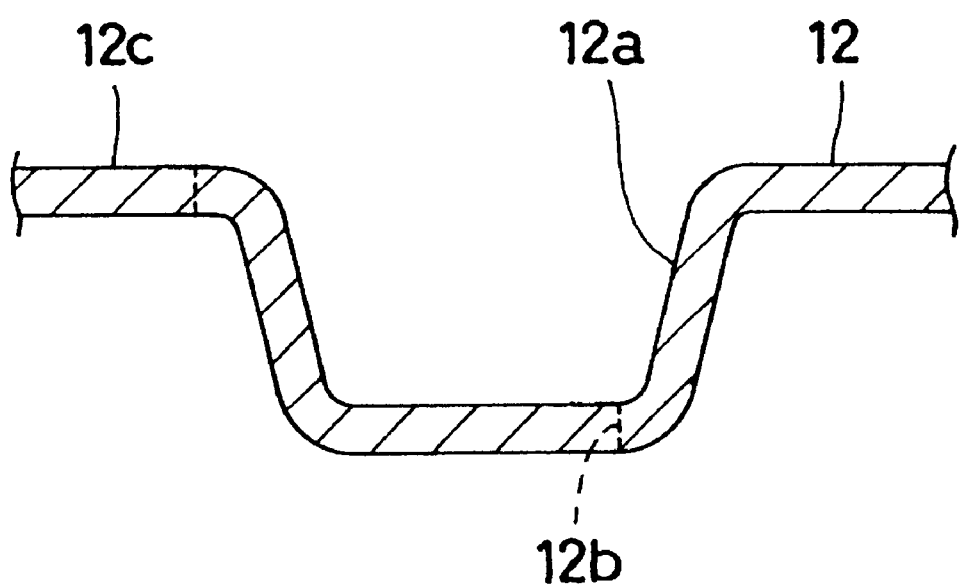
FIG. 6 is a sectional view representing the floor carpet of FIG. 3.

FIGS. 3 and 6 show the details of the floor carpet 12. A concave 12a is formed on the floor carpet 12 to be engaged with the groove 14 on the floor panel 9, and part of the concave 12a indicated by the broken line of FIG. 6 is cut off to form a hole 12b. A general designed shape 12c is formed on the remaining surface portion.

A lower rail 8 is provided in the concave portion 12a provided in the floor carpet 12 so that the lower rail lip 11 and the general designed shape 12c of the floor carpet 12 are located in almost the same line.

Figure 7:
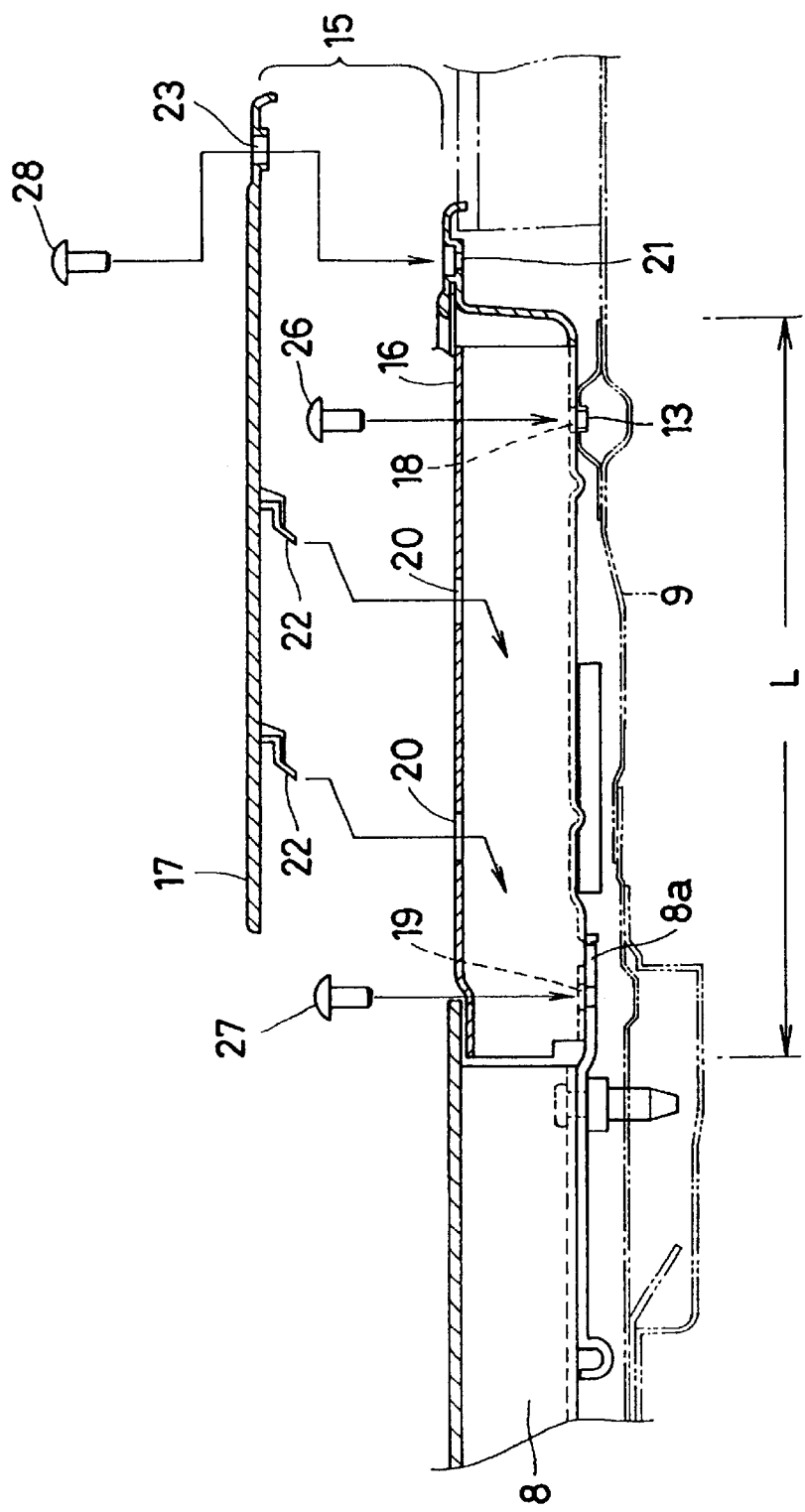
FIG. 7 is a sectional view of FIG. 2 along line Z—Z.

The following describes how to install the bracket 16 and cover 17:

As shown in FIG. 7, the installation hole 18 on the front of the bracket 16 is connected with the hole 13 of the floor panel 9 by a screw 26 through the hole 12b provided on the floor carpet 12, and the rear clamping hole 19 of the bracket 16 is locked onto the front clamping bracket 8a of the lower rail 8 embedded into the groove 14 of the floor panel 9 by a screw 27. Then the jaw 22 of the cover 17 is inserted into the square hole 20 of the bracket 16, and is slid backward. Then screws 28 are inserted into the hole 23 and hole 21 and are tightened in position.

In this case, the extension 15 additionally provided on the front of the lower rail 8 is arranged flush with lower rail lip 11, and the tip of the lower rail lip 11 and rear of the cover 17 are arranged to overlap with each other to ensure that clearance between the lower rail lip 11 fixed on the top surface of the lower rail 8 and the lip 25 of the cover 17 can be blocked.

Figure 8:
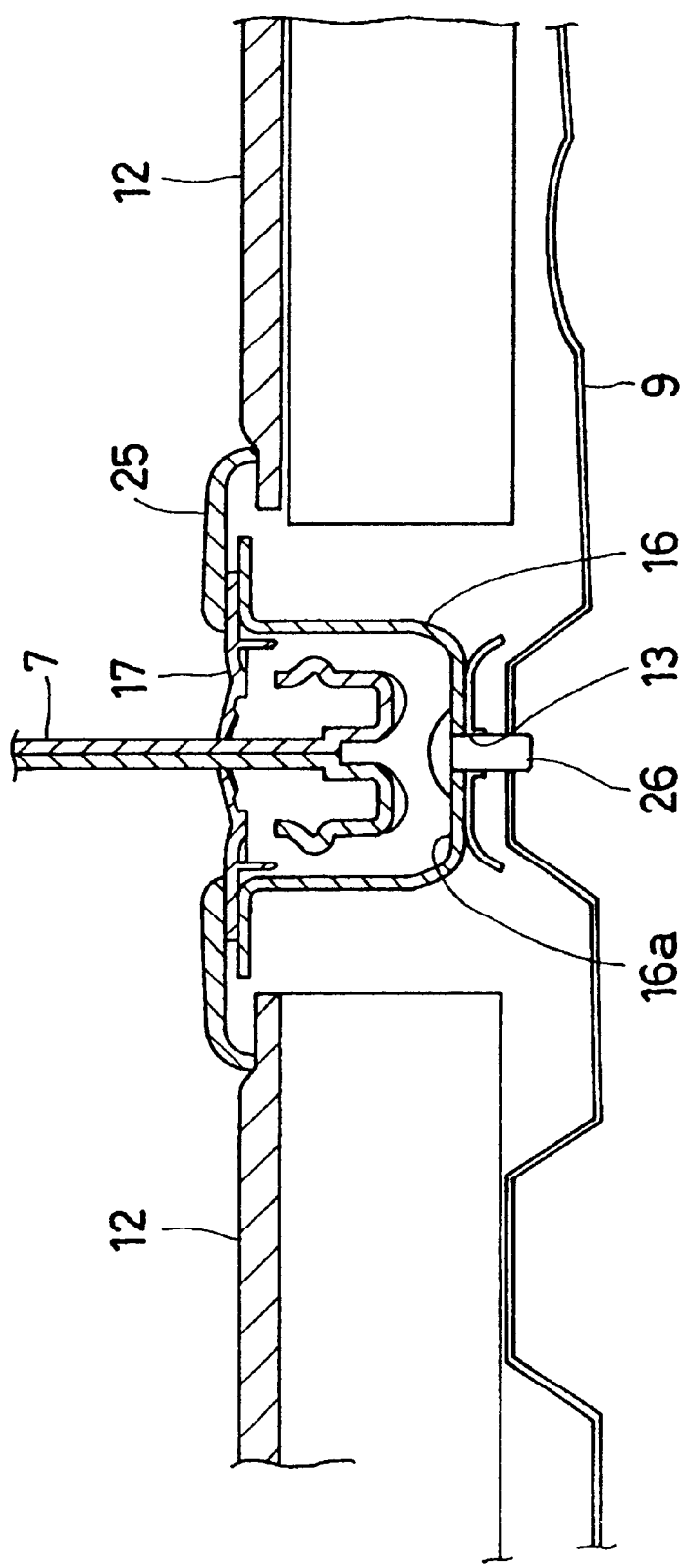
FIG. 8 is a sectional view of FIG. 2 along line Y—Y.
Figure 9:
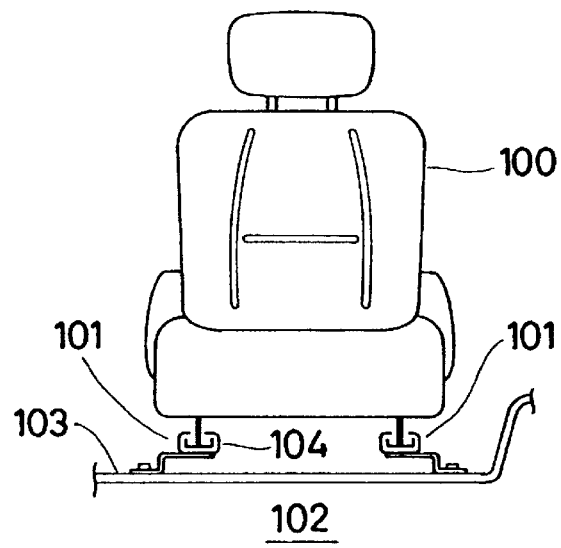
FIG. 9 shows the sliding rail structure of a conventional seat, where (a) is a front view and (b) is a perspective view.
Figure 9:
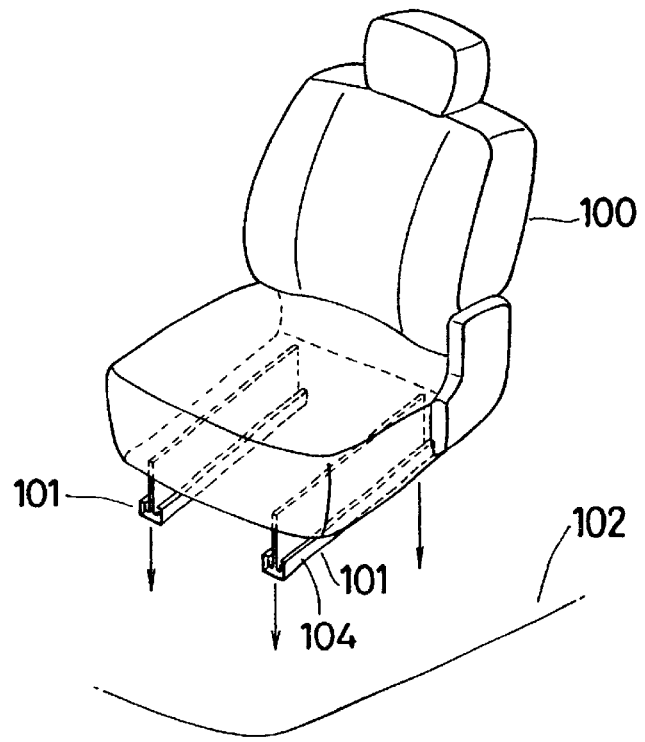
Figure 10:
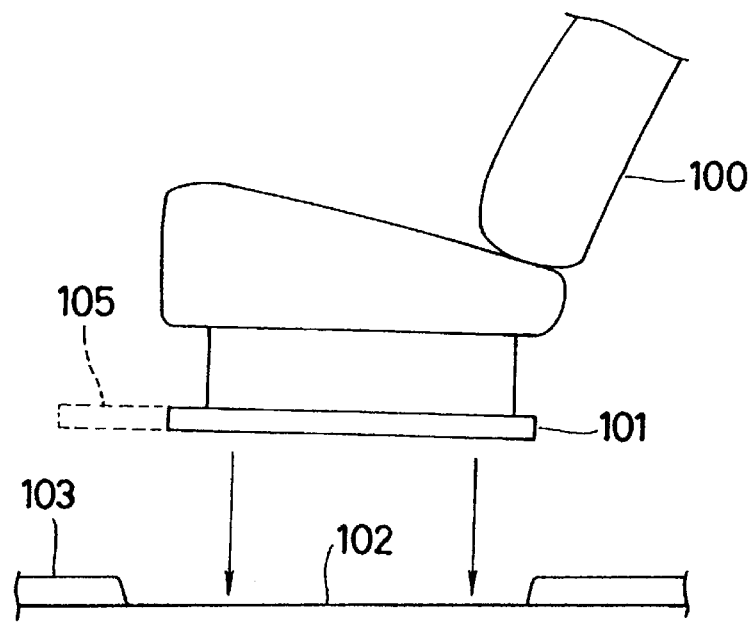
FIG. 10 is a side view representing the sliding rail structure of the conventional seat.
Figure 11:
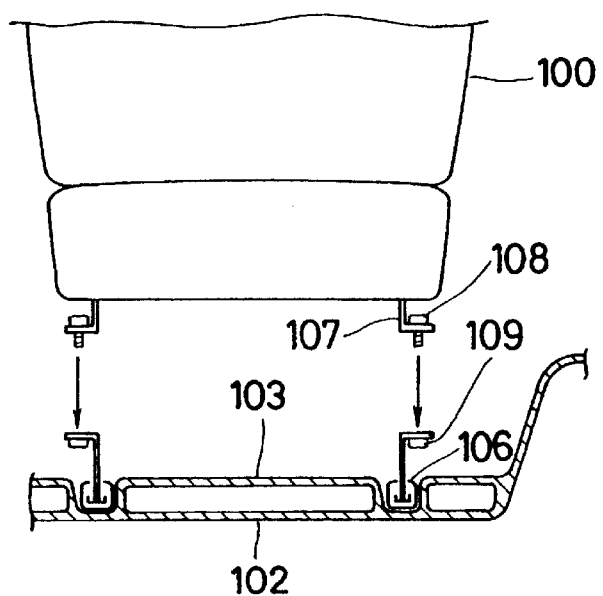
FIG. 11 is a front view representing the sliding rail structure of the conventional seat.
Figure 12:
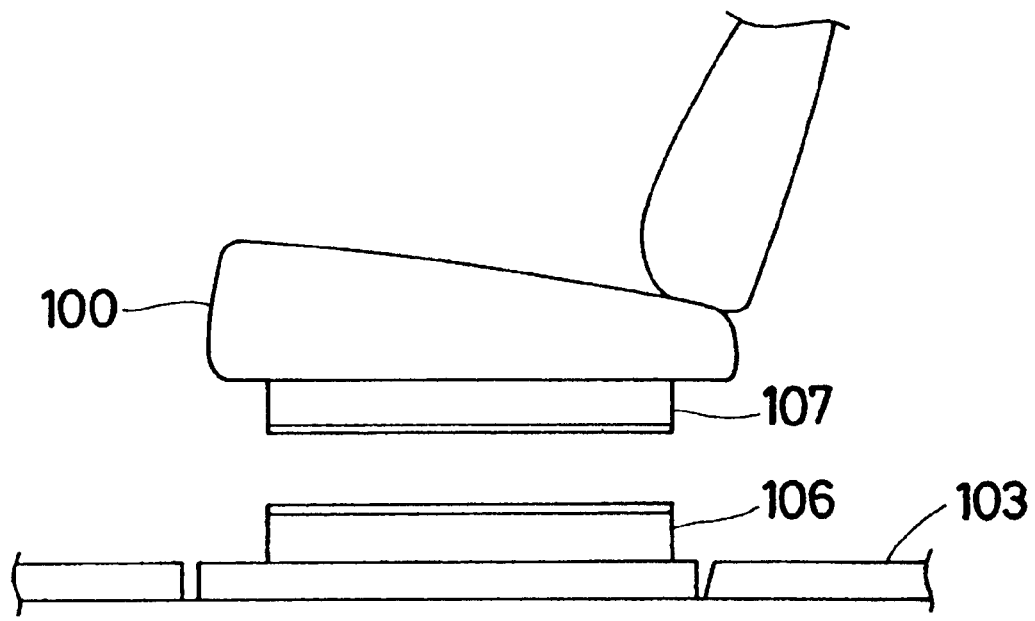
FIG. 12 is a side view representing the sliding rail structure of the conventional seat.

According to this arrangement, the upper rail 7 passes through the inside of the cross section S of the lower rail 8 when the seat 2 is located at the normal position as shown in FIG. 3, and passes through the inside of the central concave 16a of the bracket 16 when the seat 2 has shifted forward of the vehicle as shown in FIG. 8. This structure permits the sliding distance to be increased by the length L of bracket 16 plus the length of the lower rail 8.

The effects of the sliding structure of the seat are summarized as follows:

(1) The length of the upper rail 7 and lower rail 8 of the outer rail 6 has been set to allow entry into the vehicle through the door opening 10. This allows the outer rail 6 to be mounted on the seat 2 in advance.

(2) The inner rail 5 and outer rail 6 can be installed on the seat 2 using a jig before they are installed on the floor panel 9 of the vehicle. This ensures satisfactory dimensional accuracy at the position of the inner rail 5 and outer rail 6 through the seat 2, and avoids synchronization error of the slide rail 4.

(3) A groove 14 is formed on the floor panel 9 and the lower rail 8 of the outer rail 6 is embedded into the groove 14 to permit the vehicle floor surface to be made flat. This eliminates the possibility of the passenger's foot being caught by the lower rail 8 when the passenger gets on or off the vehicle or moves therein.

(4) The length of the groove 14 formed on the floor panel 9 is set at a value greater than that of the lower rail 8, and the extension 15 is arranged inside the groove 14 forward of the lower rail 8. This structure permits the sliding distance to be increased by the length L of bracket 16 plus the length of the lower rail 8; thus, the seat 2 can travel a longer distance back and forth.

(5) The bracket 16 is embedded inside the groove 14 of the floor panel 9 to increase the strength inside the groove 14 where the lower rail 8 is not located.

(6) Installation of a cover 17 improves the external appearance of the floor surface of the vehicle.

(7) A lower rail lip 11 is installed on the top surface of the lower rail 8, and a lip 25 is provided at the center of the cover 17. This structure allows the lower rail lip 11 and lip 25 as one integral unit to block the clearance with the upper rail 7, and further improves the external appearance.

(8) The lower rail 8 is embedded in the concave 12a of floor carpet 12, and the lower rail lip 11 and the general designed shape 12c of the floor carpet 12 are located in almost the same line so that the vehicle floor surface can be made flatter.

According to the present invention, a groove may be formed on the inner rail 5, similarly to the case of the outer rail 6, and the extension 15 may be used if the plane section of the vehicle floor surface is sufficiently wide and the inner rail 5 can be mounted on the plane section.

As described above, when the structure according to the present invention is used, a long traveling distance back and forth can be ensured while satisfactory dimensional accuracy for installation of the seat and sliding rail is gained at the same time. Further, a passenger is allowed to get on or off the vehicle and to move therein comfortably since the sliding rail is not protruded onto vehicle floor surface.

Furthermore, features of the cover 17 provide a seat sliding structure which improves the external appearance.

As described above, the seat sliding structure according to the present invention provides the following effects:

According to the present invetnion, in the sliding rail structure allowing back-and-forth travel of the seat with respect to the vehicle floor surface, a sliding rail comprising a lower rail and upper rail is mounted on the seat in advance, and a groove longer than the lower rail is formed in the longitudinal direction of the vehicle or the floor panel constituting the vehicle floor surface. The lower rail and the extension continuing from the lower rail are installed in the groove, and the upper rail slides inside the lower rail and extension thereof in this structure. Satisfactory dimensional accuracy at the positions of the inner sliding rail and outer sliding rail through the seat is obtained by installing the sliding rail on the seat in advance, with the result that synchronization error of the sliding rail can be avoided. Furthermore, the groove formed on the lower rail allows the vehicle floor surface to be made flat. This eliminates the possibility of the passenger's foot being caught by the lower rail when the passenger gets on or off the vehicle or moves inside the vehicle. Furthermore, this structure permits the seat sliding distance to be increased by the length of the extension in addition to the length of the lower rail. Thus, the sliding rail has a length permitting entry into the vehicle, and yet the seat has a long traveling distance back and forth after the vehicle has been assembled.

Also, the extension has a bracket provided in the groove, and the bracket is engaged in the groove of the floor panel to increase the strength inside the groove 14 where the lower rail is not located.

Further, the extension has a cover to protect the top surface of the groove, thereby improving the external appearance of the vehicle floor surface.

In addition, the lower rail lip is provided on the top surface of the lower rail and the lip is attached to the center of the cover, thereby allowing the vehicle floor surface to be made flatter.

The lower rail is laid in the concave of the floor carpet covering the floor panel, and the lower rail lip and floor carpet are located in almost the same line so that the vehicle floor surface can be made flatter. This improves the external appearance.

What is claimed:

1. A sliding rail structure mounted to a vehicle floor surface and allowing longitudinal travel of a seat with respect to the vehicle floor surface, comprising:

a sliding rail comprising an outboard rail and an inboard rail, said outboard rail comprising a lower and an upper rail adapted to be mounted on the seat;

a groove having a length that is longer than lower rail formed in the longitudinal direction of a floor panel forming a vehicle floor surface; and groove extension extending from said lower rail installed in said groove;

wherein said upper rail is positioned so as to slide within said lower rail and groove extension thereof.

2. A sliding rail structure according to claim 1 wherein said groove extension comprises a bracket within said groove.

3. A sliding rail structure according to claim 1 wherein said groove extension, further comprises a cover to protect a top surface of said groove.

4. A sliding rail structure according to claim 3 wherein the lower rail further comprises a lower rail lip on a top surface thereof attached to the center of said cover.

5. A sliding rail structure according to claim 4 wherein said lower rail is embedded in a concave portion of a floor carpet covering the floor panel, wherein said lower rail lip and floor carpet are located at substantially the same level.

6. A sliding rail structure adapted to be mounted to a vehicle floor surface and allowing longitudinal travel of a seat with respect to the vehicle floor surface, comprising:

a sliding rail comprising an outboard rail and an inboard rail, said outboard rail comprising a lower and an upper rail adapted to be mounted on the seat; and a groove extension extending from said lower rail adapted to be installed in a groove having a length that is longer than said lower rail formed in the longitudinal direction of a floor panel forming a vehicle floor surface, wherein said upper rail is positioned so as to slide within said lower rail and groove extension thereof.

* * * * *

UNITED STATES PATENT AND TRADEMARK OFFICE
CERTIFICATE OF CORRECTION

PATENT NO.     : 6,655,739 B2
DATED          : December 2, 2003
INVENTOR(S)    : Furukawa It is certified that error appears in the above-identified patent and that said Letters Patent is hereby corrected as shown below:

<u>Title page</u>,
Item [56], References Cited, U.S. PATENT DOCUMENTS,
"Gobel et al." should read -- Gobeil et al. --.

<u>Column 6</u>,
Line 50, after "than" insert -- said --;
Line 53, before "groove" insert -- a --;
Line 61, after "extension" cancel the comma ",".

<u>Column 7</u>,
Line 5, "scat" should read -- seat --.

Signed and Sealed this

Ninth Day of March, 2004

JON W. DUDAS
*Acting Director of the United States Patent and Trademark Office*